INVENTOR.
JAMES W. SCHWARTZ
BY
OSTROLENK, FABER, GERB & SOFFEN
ATTORNEYS

INVENTOR.
JAMES W. SCHWARTZ

OSTROLENK, FABER, GERB & SOFFEN
ATTORNEYS 3,386,354
Patented June 4, 1968

3,386,354

LENS SYSTEM FOR CORRECTING EFFECT OF EARTH'S MAGNETIC FIELD IN COLOR TUBES

James W. Schwartz, Western Springs, Ill., assignor to National Video Corporation, Chicago, Ill., a corporation of Illinois Filed Oct. 1, 1965, Ser. No. 491,972
8 Claims. (Cl. 95—1)

ABSTRACT OF THE DISCLOSURE

Method and apparatus for enhancing the color purity of a color receiver tube of the shadow-mask type by compensating for the effect of the earth's magnetic field upon the electron beam of the color receiver tube. The method consists of providing a corrective lens system to appropriately position phosphor dots deformed during the deposition process so as to be in the appropriate location in order to be impinged upon by only its associated electron beam. The corrective system is used in addition to the normal lens systems employed for the purpose of correcting for the effects of misconvergence and radial misregister.

The instant invention relates to color television receivers and more particularly to a novey method and apparatus for producing color TV tubes which upon assembly, are substantially compensated for effects produced by the vertical component of the earth's magnetic field.

The most prevalent color tube used today throughout the world is typically referred to as the "shadow-mask" tube. Basically, the shadow-mask tube is comprised of a screen, having a phosphor dot pattern of the three primary colors, red, green and blue, which dots are arranged in triads, with each triad being comprised of a phosphor dot of each of the primary colors. The shadow-mask tube is further comprised of a mask having a large number of openings or holes, with the shadow-mask being located a predetermined spaced distance away from the tube screen and with each hole in the shadow-mask being associated with one phosphor triad. The color tube is further provided with three electron beams arranged in an equally spaced manner about the tube longitudinal axis such that the geometry of the electron beams, the shadow-mask and the phosphor dot pattern causes each electron beam to impinge upon only those phosphor dots of one predetermined color.

In order that a tube raster be successfully formed, the neck of the tube is provided with suitable deflection coils to deflect all of the beams in two mutually perpendicular directions. The electron beams may crudely be thought of as moving along a straight line from the electron gun and through the shadow-mask to the phosphor dot pattern of the tube screen. In actuality, the electron beams undergo deflection due to the energization of the tube deflection coils so as to follow a curved path in the region of influence of the deflection coils. Once the electron beams have passed beyond the region of influence of the deflection coils the beams may crudely be considered as moving along a straight line in traveling toward the tube screen. If these straight lines are extended rearwardly to a plane, commonly referred to as the deflection plane, the intersections of these straight lines with the deflection planes are typically referred to as the "effective" color centers of the three electron beams. These principles are most important considerations in the formation of the color tube phosphor dot pattern.

Typically, the process of forming the phosphor dot pattern involves the steps of: separating the tube screen and shadow-mask; coating the tube face with a phosphor which emits one of the primary colors; re-uniting the screen and shadow-mask; and mounting the screen and shadow-mask in a lighthouse apparatus containing a (ideal) "point" light source which is physically located at the effective color center of the associated electron beam.

The electron beams follow a curved path in the region of the deflection coils which has an increasingly smaller radius of curvature for increasingly larger deflections, i.e., deflection in the immediate region of the periphery of the tube face, causing the effective color centers to change their location within the deflection plane.

In order to properly position all of the phosphor dots upon the tube face various lens systems have been developed which, when interposed between the point light source and the tube mask and screen, bend or reflect the light rays emitted from the point light source in a manner which fully takes into consideration the changes in the effective color center of the associated electron beam. One such lens system is set forth in detail in copending application Ser. No. 472,169, entitled Lens System for Color Television Tube, filed July 15, 1965 by James Schwartz et al. and assigned to the assignee of the instant invention. The above mentioned lens system is so designed as to fully correct for radial misregister and misconvergence so as to produce a color tube having a phosphor dot pattern and overall tube geometry to attain extremely high color purity.

The above mentioned lens system, as well as other present day lens systems however, do not make any provision for the effect which the earth's magnetic field exerts upon the electron beams with the color tube. This effect basically occurs during the period in which the electron beam leaves the electron gun and terminates when the electron beam impinges upon the phosphor dots with which the beam is associated. Considering the earth's magnetic field in the northern hemisphere, in which the United States lies, this magnetic field may be represented by a vector which is inclined at an angle of approximately 70° relative to the earth's surface in the United States. The magnetic field vector may be broken into its horizontal and vertical components, thus resulting in a horizontal component which is directed generally toward the North Pole and a vertical component directed generally toward the earth's core. Since the color tube occupies a very minute amount of space relative to the entire northern hemisphere, the magnetic field can be considered to be essentially uniform in the immediate region of the color tube.

It is well known that an electron moving with a substantially constant velocity through a uniform magnetic field experiences a force perpendicular to the direction which the electron moves, thereby causing the electron to follow a curved path which is a function of the velocity of the electron, the strength of the magnetic field, and the angle between the direction of the velocity vector and the direction of the magnetic field vector. It is virtually impossible to provide means within the color tube to correct for the effect which the horizontal component of the earth's magnetic field exerts upon the color tube electron beams. Numerous tube shielding schemes have been deviced, but they have all been found to be either unnecessarily large or substantially ineffective for the purpose for which they have been designed. Since a color TV receiver may be located within a room or upon a surface in any positon around a 360° angle, even assuming that some means might be integrated within the tube to compensate for the horizontal component of the earth's magnetic field, the rotation of the color TV receiver set to a different angle upon the surface which supports it would totally alter the requirement of the compensating scheme. It has been noted, however, that the horizontal component of the earth's magnetic field is small in magnitude relative to the vertical component and its effect upon the color tube electron beams can substantially be ignored.

Turning our major concern to the effect of the vertical component of the earth's magnetic field, it can clearly be seen that rotation of the color TV set upon its horizontal supporting surface through any angle-large or small-will in no way effect the deflection which the electron beams undergo due to the influence of the vertical component of the earth's magnetic field. So long as the color receiver set is maintained substantially level relative to the earth's surface, it is possible to incorporate means within the color tube to substantially fully compensate for the effect of the vertical component of the earth's magnetic field upon the electron beams.

Schemes have been devised to a produce a phosphor dot pattern in color tubes which particularly take into account the effect of the earth's magnetic field upon color purity. All of these schemes employ a correction which is substantially uniformly applied to the entire phosphor dot pattern. Since the effect which the earth's magnetic field has upon the electron beams is non-uniform and is dependent upon the angle of deflection which each electron beam experiences in generating a raster, such uniform compensating approaches do not produce a tube having high color purity.

The instant invention contemplates the use of a lens system which is supplementary to the lens system used to correct for the effects of misconvergence and radial misregister with the lens system of the instant invention being employed in a single lighthouse simultaneously with the use of the lens system employed to correct for the effects of misconvergence and radial misregister. The steps of forming a color tube phosphor dot pattern having extremely high color purity are comprised of: coating the tube face with a phosphor material which emits one of the primary colors; uniting the tube mask and the tube screen and properly positioning them in the lighthouse; placing the point light source at the effective color center of the electron beam associated with the color phosphor coated upon the tube face; properly positioning the lens system employed for correcting for the effects of misconvergence and radial misregister and the lens system for correcting for the effect of the earth's magnetic field upon the electron beam, with these lens systems being appropriately positioned between the light source and the shadow-mask; illuminating the point light source; and finally, washing away the unexposed areas of the phosphor coating to form the dot pattern for one primary color. It should be clearly understood that the above steps are repeated in order to obtain the final phosphor dot pattern comprised of all three primary colors.

The lens employed to correct for the effect of the vertical component of the earth's magnetic field upon the electrons has a lens design which fully takes into account the non-uniform differences in deviations from a straight line path for differing deflection angles from the undeflected electron beam.

It is therefore one object of the instant invention to provide a novel method and apparatus for producing color tubes having excellent color purity.

Another object of the instant invention is to provide a novel method and apparatus for producing color tubes of the shadow-mask type which have the characteristic of excellent color purity.

Still another object of the instant invention is to provide a novel method and apparatus for producing color tubes of the shadow-mask type which is comprised of utilizing a lens system which is designed to compensate for the effect of the earth's magnetic field upon the color tube electron beams.

Another object of the instant invention is to provide a novel method and apparatus for producing color tubes of excellent color purity which is comprised of employing a special lens system during the phosphor dot deposition process to compensate for the effect of the earth's magnetic field upon the color tube electron beams.

Another object of the instant invention is to provide a novel method and apparatus for producing color tubes of excellent color purity which is comprised of employing a special lens system during the phosphor dot deposition process to compensate for the effect of the vertical component upon the color tube electron beams.

These and other objects of the instant invention will become apparent when reading the accompanying description and drawings in which.

Figures 1, 2, 2A:
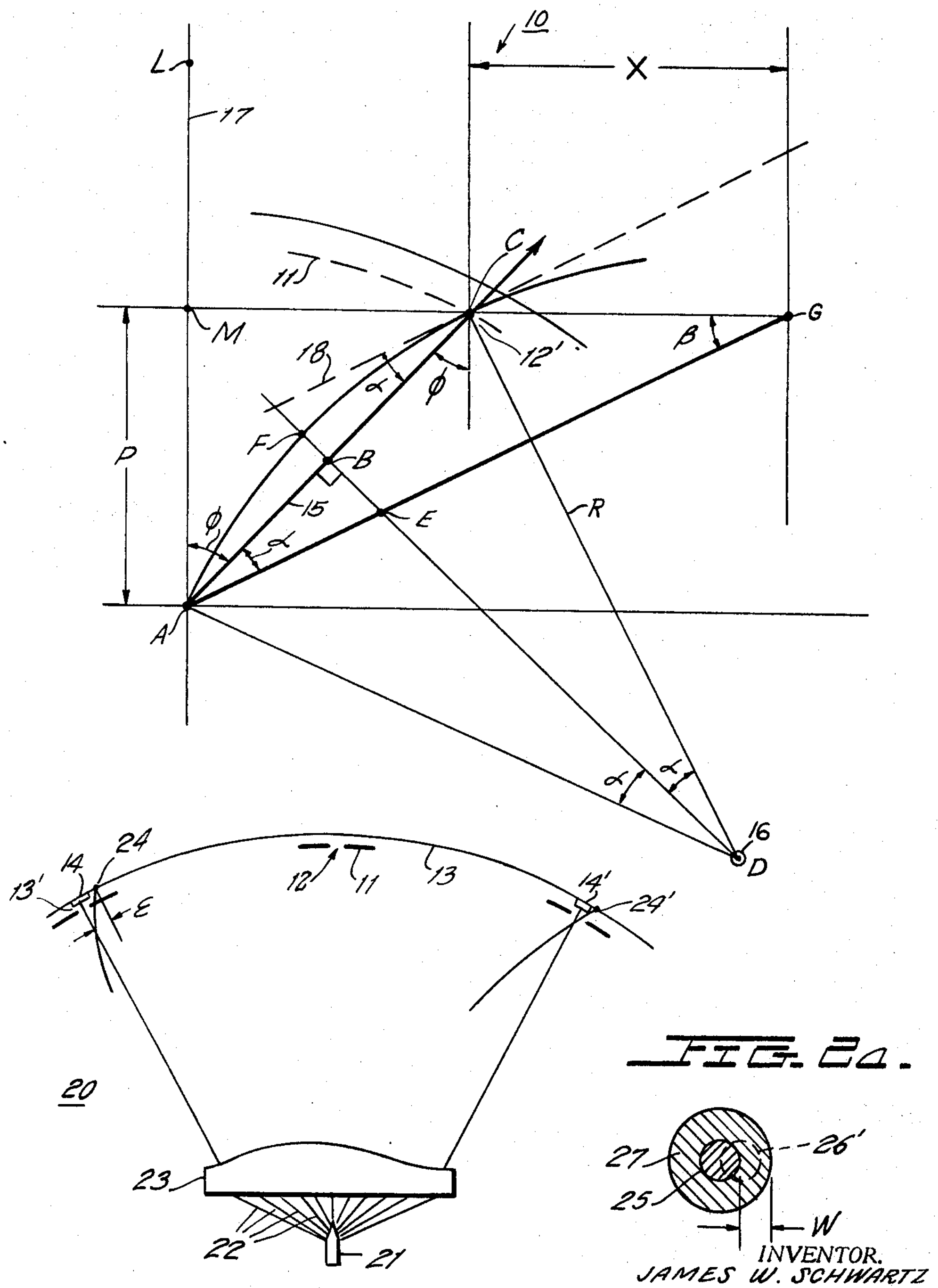
FIGURE 1 is a diagram of an electron beam path in a color television picture tube showing how the deviation between the desired landing and the actual landing may be determined.
FIGURE 2 is a diagram showing the shadow-mask and screen of a picture tube for the purpose of describing the deviation between the desired landing of a beam and the actual beam landing.

FIGURE 2*a* shows a typical phosphor dot forming the phosphor dot pattern of a shadow-mask color tube for the purpose of explaining the use of the guard band.

Figures 3, 5A, 6, 7:
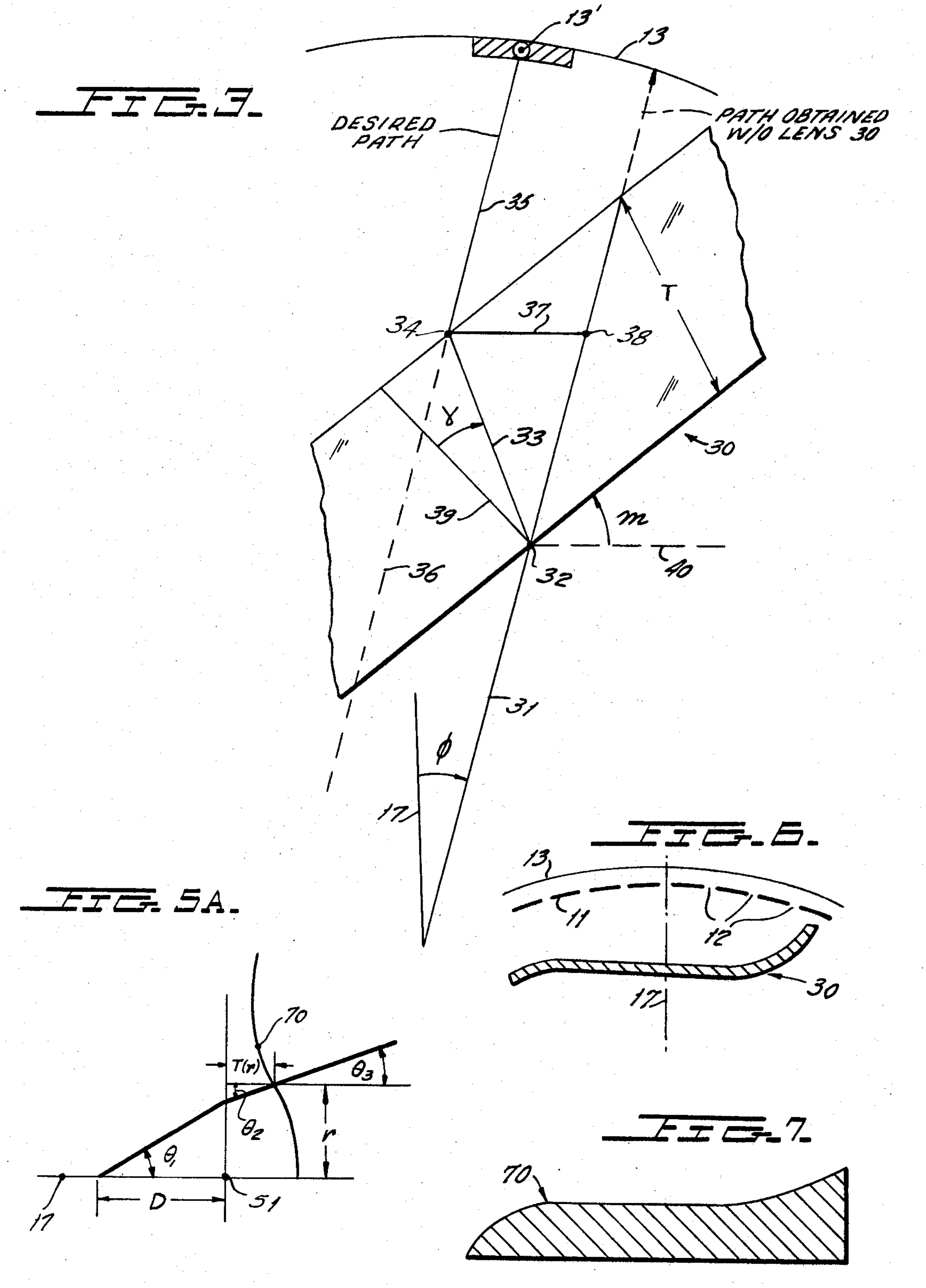

FIGURE 3 is a diagram showing a portion of a lens system used for determining the configuration of one preferred lens system designed in accordance with the principles of the instant invention.

Figure 4:
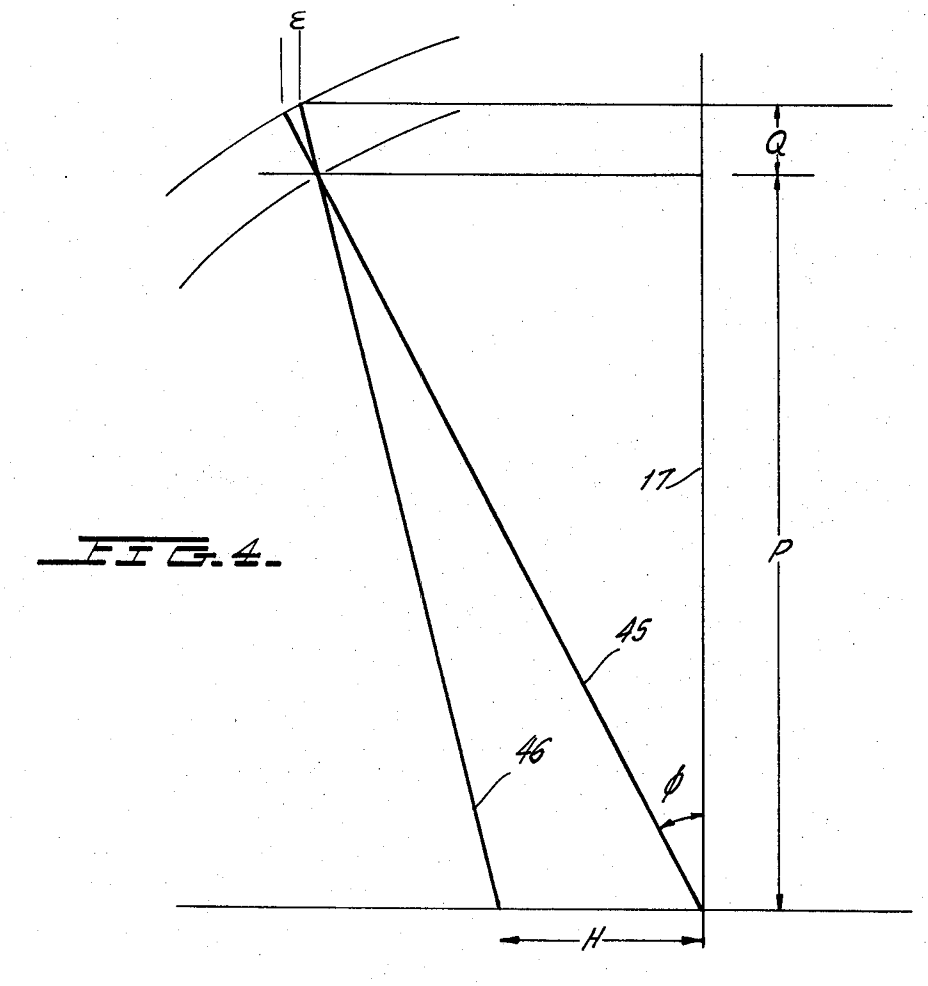

FIGURE 4 is a geometric diagram provided for the purpose of further determining the design of a lens system incorporating the principles of the instant invention.

Figure 5B:
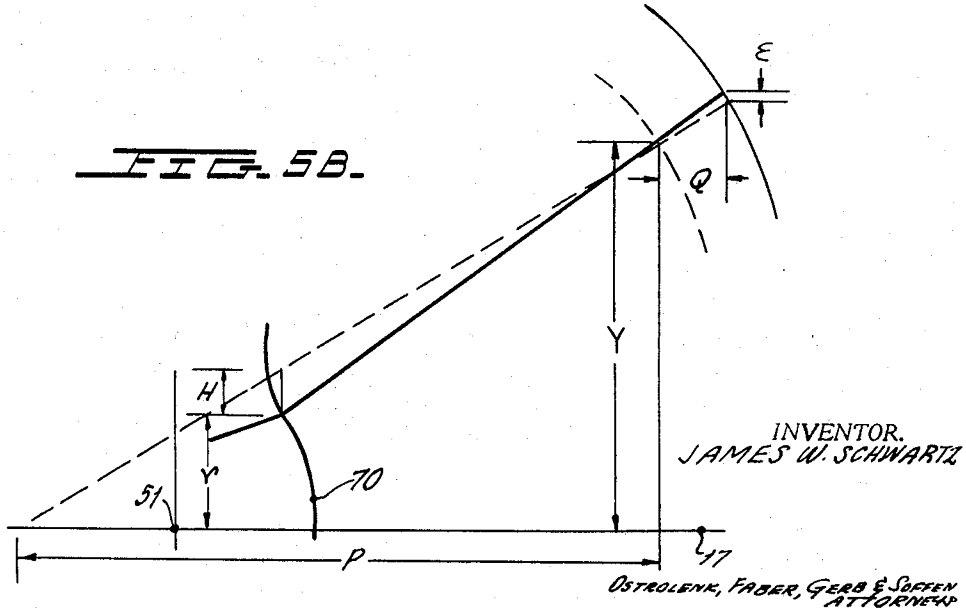

FIGURES 5*a* and 5*b* are geometric diagrams shown for the purpose of describing the manner in which an alternative lens system incorporating the principles of the instant invention is designed.

FIGURE 6 is an end view showing one preferred lens system incorporating the principles of the instant invention.

FIGURE 7 is an end view showing another preferred embodiment of a lens system designed in accordance with the principles of the instant invention and which may be adopted as an alternative to the lens design of FIGURE 6.

Referring now to the drawings, FIGURE 1 shows a diagrammatic representation 10 of the major elements in a color tube of the shadow-mask type which are directly affected by the vertical component of the earth's magnetic field. The point A represents the color center of one of the three electron beams employed in a typical color tube of the shadow-mask variety. The other details and specific configuration of such a shadow-mask tube have been omitted for the purpose of clarity. It should be clearly understood that a tube of this variety is normally comprised of three separate electron guns arranged at 120° intervals around a circle of constant radius with the center of the circle lying on the longitudinal axis of the color tube. Each of the three sources are inclined toward the longitudinal axis of the color tube so that their electron beams, when undeflected will pass through an opening in the shadow-mask at substantially the geometric center of the tube face. Two configurations of this basic design are well known through the industry and one such typical configuration is depicted in FIGURE 1 of the previously mentioned copending application Ser. No. 472,169.

A portion of the shadow mask is designated by the numeral 11 (see FIG. 2). The mask is provided with a plurality of openings which are geometrically associated with phosphor dots 14 provided on the tube face 13 so as to cause each electron beam to strike phosphor dots of only one color, there being a separate electron beam for each of the three primary colors forming the final phosphor dot pattern.

Arrow 15 represents the velocity vector of one of the electron beams of the color tube. The symbols 16 represent the direction of the vertical component of the earth's magnetic field relative to the color tube. It should be understood that the tube longitudinal axis (not shown) lies substantially in the horizontal direction which may be considered to be in the plane of FIGURE 1 with the vertical component 16 of the earth's magnetic field being perpendicular to the plane of FIGURE 1 and being directed into the plane of the figure. The movement of the electron beam 15 through the substantially uniform magnetic field 16 causes the electron beam to move along a curved path represented by the arc AFC. The radius of curvature of this arc is represented by line FBD. The radius of curvature R is a function of the velocity of the electrons forming the electron beam, the magnitude of the magnetic field and the angle between the electron velocity vector 15 and the field vectors 16. The phantom line 17 represents the longitudinal axis of the color tube. Assuming that the electron beam lies at a region of zero magnetic field in moving from its color center A to screen 13, line ABC represents the path which an electron beam would follow in order to impinge upon phosphor dot 14' if it were not curved (i.e., deflected) by the earth's magnetic field. Line ABC also represents the chord of arc AFC. The symbol $\phi$ represents the deflection angle of the electron beam from the tube longitudinal axis 17. The chord ABC passes through the opening 12' in shadow-mask 11 at point C. Line FBD represents the perpendicular bisector of chord ABC. Dotted line 18 is drawn tangent to arc AFC through point C forming an angle $\alpha$ with chord ABC. Line 18, being tangent to arc AFC at point C, forms a right angle with radius CD. Thus, angle BCD is equal to $(90°-\alpha)$. Since angle CBD is a right angle, angle BDC is equal to $\alpha$.

From FIGURE 1 it can be seen that $$\sin \alpha = \frac{P}{2R \cos \phi} \qquad (1)$$

where P is equal to the length of line AM and the length of P is a function of the deflection angle $\phi$, i.e., $$P = P(\phi) \qquad (2)$$

and where the radius of curvature R is a function of the velocity of the electron. It is being assumed for the purpose of this example that the magnitude of the magnetic field vector is constant and that the angle beween the magnetic field vector and the velocity vector is equal to 90°.

Considering Equation (1), in the case where the deflection angle $\phi$ is equal to zero, $$\sin \alpha_0 = \frac{P(\phi=0)}{2R} \qquad (3)$$

If a panel is offset by a distance $x$ as shown in FIGURE 1, a light ray following path AEG, which is parallel to electron path tangent line 18 will properly locate a phosphor dot during the screen printing process. The offset distance $x$, i.e., the distance CG is given by $$x = \frac{P/\cos \phi \sin \alpha}{\sin \beta} \qquad (4)$$

where $\beta$ is the angle between lines AEG and GCM where GCM is perpendicular to the longitudinal axis 17 of the tube. From triangle ACG it follows that $$\beta = 180° - (90° + \phi) - \alpha = 90° - \phi - \alpha \qquad (5)$$

since $\sin \beta = \sin (90° - \phi - \alpha)$ $$\sin \beta = \cos (\phi + \alpha) \qquad (6)$$

so that Equation (4) becomes $$x = \frac{P \sin \alpha}{\cos \phi \cos (\phi + \alpha)} \qquad (7)$$

combining Equations 7 and 1 we obtain:

$$x_{\text{offset}} = \frac{P^2(\phi)}{2R \cos^2 \phi \cos (\phi + \alpha)} \qquad (8)$$

From a consideration of practical tube dimensions, it can be shown that $$|P^2(\phi)|$$

does not change appreciably in comparison with the changes in the cosines which continually change in value for changes in the deflection angle $\phi$. The dimension P is of the order of 12 inches in conventional shadow-mask tubes. The maximum change in the Value P, i.e., $\Delta P = P_{\max} - P$, is approximately 2 inches. Thus, the change in P is of the order of 20% and the $P^2$ term of the order of 40%.

By comparison $\cos \phi$ varies from 1.0 to approximately .7. Since $\alpha$ is small and essentially constant the term $\cos^2 \phi \cos (\phi + \alpha)$ varies from nearly 1.0 to less than .35 or nearly 300%. Hence the variation in the cosine terms is the most significant effect in causing a variation of the value of $x$ with varying beam deflection positions.

It can clearly be seen that the deviation $x$ represents increasingly larger values for increasingly larger deflection angles. Since there is a non-constant deviation value, this means that no single uniform displacement can be made to the color tube components during exposure in order to produce a tube of good color purity.

The data leading to the solution of the deviation values for the entire tube face may now be utilized to develop a lens which will fully compensate for the effect of the vertical component of the earth's magnetic field upon the electron beam as it moves from its color center toward the tube face. Two types of lenses may be developed either of which will provide the necessary compensating effects. These are the contoured lens and the flat plate lens. The contoured lens is formed from a solid block of a suitable lens material and is shaped so as to have the contour generally as is shown in FIGURE 7 to provide the required compensating effects during the phosphor dot forming operation so as to displace the phosphor dots of each color by a varying amount in order to insure the fact that the electron beam which is under the influence of the earth's magnetic field will strike the associated phosphor dots to insure excellent color purity. The flat plate lens is preferably formed of a flat sheet of suitable transparent material having a predetermined thickness and index of refraction. The flat sheet is then bent or otherwise formed in the configuration as shown in FIGURE 6 with the specific cross-sectional configuration being determined in a manner to be more fully described so as to provide the necessary compensating effect.

FIGURE 3 shows a section of the lens sheet of FIGURE 6 in greater detail for the purpose of describing the manner in which the slope of the lens 30 is determined. Turning for a moment to the consideration of FIGURE 2, there is shown therein a diagrammatic representation of the manner in which the phosphor dot exposure process is performed. The arrangement 20 of FIGURE 2 is comprised of a point light source 21 which is designed to emit light rays 22 from the point light source toward the tube mask 11 and face 13, respectively. 23 diagrammatically represents the lens system which is interposed between light source 21 and mask and screen 11 and 13, respectively, for the purpose of bending or refracting the light rays 22 so as to provide the necessary corrective measures to compensate for radial misregister and misconvergence. These corrective measures are described in great detail in copending application Ser. No. 472,169 and will be omitted here for the sake of brevity. The lens system 23 functions to bend the light rays in such a manner as to create the impression, from the viewpoint of each phosphor dot, that the color center for each phosphor dot is the properly corrected color center, i.e., the lens operates in such a manner as to bend the light rays so as to substantially exactly simulate the path taken by the electron beam to strike any given phosphor dot.

Only a portion of the light rays pass through the holes 12 in mask 11 so as to cast a dot or circle of light upon the phosphor coating (not shown) deposited upon the tube face. When the tube face is removed from the lighthouse apparatus and washed with a suitable solution, the unexposed regions of the phosphor coating are easily washed away while the exposed regions strongly adhere to the tube face forming a dot pattern of one of the three primary colors. It can clearly be seen that, in order to obtain the completed dot pattern of the three primary colors the above steps are repeated two more times with the phosphor coatings of the remaining primary colors being coated upon the tube face and exposed in a like manner.

Due to the fact that the lens system 23 has no capability for correcting for the effect which the earth's magnetic field has upon the electron beam, the electron beams will strike at a location such as, for example, the locations 24 and 24', which are removed from their associated phosphor dots 14 and 14', respectively, by a deviation distance $\epsilon$ with this deviation distance being a function of the deflection angle $\phi$, previously described.

One approach for enhancing the probability that the electron beam will strike the desired phosphor dot is to provide each phosphor dot with a "guard band." FIGURE 2*a*, for example, shows a typical phosphor dot 25 which has a diameter substantially equal to the diameter of the portion of the electron beam which will pass through the associated opening in the shadow-mask for this particular phosphor dot, this being the ideal diameter. Since the electron beam follows a curved path its angle of incidence relative to the shadow-mask at the point where the electron beams passes through an opening will be different from the "ideal" angle of incidence which the electron beam makes with the shadow-mask assuming it were not under the influence of the earth's magnetic field. This will, therefore, cause that portion of the electron beam which passes through the opening in the shadow-mask to strike the tube face in such a manner so that only a portion of the beam, or possibly none of the beam, will strike the phosphor dot 25, such as is shown by the dotted circle 26'. Since only a small portion of the electron beam 26' strikes the dot 25, improper operation would result. Phosphor dot 25 may be provided with a "guard band" 27, which, as a practical matter, simply means providing a phosphor dot of larger diameter through the electron spot size impinging the dot. Due to the relatively large amount of phosphor dots provided on the tube screen (approximately one million), and the criticality of the positions which these phosphor dots must occupy, the maximum permissible width W of the guard band is only a few thousands of an inch. Experimentation has shown that the deviation distances $\epsilon$ achieve values of 10 mils leading to the result that the guard band 27 is substantially ineffective in producing the desired results.

Returning to a consideration of FIGURE 3, line 31 represents a light ray moving in the direction shown by the arrowhead which impinges upon one surface of the lens sheet 30 at point 32. The light ray 31 is refracted or bent by an amount which is a function of the index of refraction N and the angle of incidence of the light ray 31. The light ray now moves in the direction shown by line 33. In a like manner, the light ray 33 leaves lens 30 at an angle which is a function of the index of refraction N and the angle which the light ray 33 makes with the upper surface of lens 30 at point 34. The light ray then moves in the direction of the shadow-mask represented by the line 35.

Dotted line 36 is drawn through point 34 parallel to line 31 with the length of line 37 represented by the symbol H drawn between points 34 and 38 representing the deviation distance between line 31 and line 36.

From a consideration of the diagram of FIGURE 3, T represents the thickness of lens 30, $\gamma$ represents the angle between line 33 and line 39 which is normal to the surface of lens 30, and $\phi$ represents the deflection angle between the tube longitudinal axis and light ray 31; and $m$ represents the slope of lens 30 at point 32 relative to a line 40 perpendicular to the tube longitudinal axis. It can be seen that $$\sin \gamma = \frac{\sin (\phi + m)}{N} \quad (9)$$

$$\tan \gamma = \frac{\sin (\phi + m)}{[N^2 - \sin^2 (\phi + m)]^{1/2}} \quad (10)$$

and $$\frac{H}{\sin (\phi + m - \gamma)} = \frac{T/\cos \gamma}{\sin (90^\circ - \phi)} \quad (11)$$

Rearranging Equation 11, $$H = \frac{T \sin (\phi + m - \gamma)}{\cos \alpha \cos \phi} \quad (12)$$

Using the identity $$\sin (a + b) = \sin a \cos b + \sin b \cos a$$

this yields $$\sin (\phi + m - \gamma) = \sin (\phi + m) \cos \gamma - \sin \gamma \cos (\phi + m)$$

where $\phi + m = a$ and $-\gamma = b$ (13)

Substituting Equation 13 into Equation 12

$$H = \frac{T}{\cos \phi} \left[ \frac{\sin (\phi + m) \cos \gamma - \sin \gamma \cos (\phi + m)}{\cos \gamma} \right] \quad (14)$$

$$H = \frac{T}{\cos \phi} \left[ \sin (\phi + m) - \frac{\cos (m + \phi) \sin (m + \phi)}{[N^2 - \sin^2 (\phi + m)]^{1/2}} \right] \quad (15)$$

The value H can now be readily calculated from Equation 15 knowing the values of the lens thickness T, deflection angle $\phi$, index of refraction N and slope $m$. Actually the known quantities are the deviation distance H, thickness T, deflection angle $\phi$ and index of refraction N with the only unknown of Equation 15 being the slope of the lens 30. The manner in which the slope or angle $m$ is determined is as follows:

A color tube of the shadow-mask type is produced using no corrective measure to compensate for the effect of the earth's magnetic field (vertical component) upon the electron beams. The deviation distance between each phosphor dot and the position at which the electron beam actually strikes the surface of the tube face is then measured for each and every deflection angle $\phi$ associated with each phosphor dot. Knowing all of the deviation distances and the thickness T and index of refraction N, as well as the deflection angles $\phi$ associated with each deviation distance Equation 15 may now be employed to determine the slope of lens 30 for each given point of the lens.

FIGURE 6 shows an end view of the resulting configuration for lens 30 and its relationship to the mask 11, tube face 13 and longitudinal axis 17, when positioned in the lighthouse apparatus (not shown) employed during the phosphor dot deposition process. The actual mechanics of the lighthouse apparatus have been omitted herein for the sake of brevity, detailed descriptions of such lighthouse apparatus being set forth in U.S. Patents 2,885,935, 3,109,116, 3,003,874, 2,817,276 and 2,936,682, to mention just a few.

The actual deviation distances $\epsilon$ which are measured at the tube face are translatable into the deviation distances H in a manner as can best be seen from a consideration of FIGURE 4. As shown therein, the longitudinal axis is represented by the line 17 with the distance P representing the distance between the color center and the tube face. $\phi$ represents the deflection angle of the line 45 from the longitudinal axis.

Q represents the distance measured parallel to the tube axis between the mask and the screen. It follows from FIGURE 4 that $$H=\frac{P\epsilon}{Q} \qquad (16)$$

As a practical matter it is advantageous to offset the light source by an amount which produces the proper phosphor dot positions at the center of the tube face. The auxiliary lens need then correct only for deviation values which are not corrected by this uniform geometric offset.

The lens of FIGURE 6 is capable of actually offsetting rays from the light source. An alternate approach is to simply bend the ray angles so that they intersect each point of the mask at the same angle as each respective curved electron path. A lens of the type, shown in FIGURE 7, can be used to accomplish this result.

Equation 16 yields a simple accurate means for determining the deviation values H from the actual deviation measurements $\epsilon$ made at the tube face.

The cylindrical lens of FIGURE 7 has a surface contour or slope as shown in the figure, which slope is a function of the deflection angle, index of refraction of the glass and deviation distance $\epsilon$. Turning to FIGURES 5*a* and 5*b*, line 17 represents the tube longitudinal axis with angle $\phi_1$ being the initial angle a ray path makes with the longitudinal axis. The thickness of the lens is a function of the deflection angle and hence changes for increasing lens coordinate $r$ as measured perpendicularly from the line 51. The thickness T of lens 70 is thereby substantially dependent upon the coordinate $r$ from the longitudinal axis 51.

It may be calculated by the following procedure: Divide the lens coordinate $r$ up into a convenient series at values with increments such as $\frac{1}{100}$ of an inch. Pick an initial lens thickness $T(o)$ at the tube axis ($r=0$). Then (1) Increase $r$ by the increment value.

(2) Extrapolate the lens thickness $T(r)$ from numerical values of $T(r)$ and its incremental derivatives at the previous point in the lens.

(3) Calculate $\sin\theta_1$ from the expression $$r=D\tan\theta_1+\frac{T(r)\sin\theta_1}{(N^2-\sin\theta_1)} \qquad (17)$$

where D is the axial distance to the first surface of the lens and N its index of refraction.

(4) Calculate $N\cos\theta_2$ from the expression $$N\cos\theta_2=\sqrt{N^2-\sin^2\theta_1} \qquad (18)$$

(5) Find the correct value of Y, P and $\epsilon/Q$ by iteratively inserting a best guess for Y in the expression $$Y=\frac{P}{D+T}\left(r+(P-D-T)\left[\frac{\epsilon}{Q}\right]\right) \qquad (19)$$

where $\epsilon$ is the displacement of the electron landing, and Q the axial separation ol mask and screen at R. Values of $\epsilon/Q$ are known for each Y. Since Q is a mechanical design parameter of the tube and $\epsilon$ an easily measured value.

(6) Calculate Tan $\theta_3$ from the expression $$\tan\theta_3=\frac{r+P\left(\frac{\epsilon}{Q}\right)}{D+T} \qquad (20)$$

(7) From the value of $\tan\theta_3$ calculate also $\sin\theta_3$ and $\cos\theta_3$.

(8) Calculate the slope of the lens surface from the expression $$\frac{dT}{dr}=\frac{\sin\theta_3-\sin\theta_1}{N\cos\theta_2-\cos\theta_3} \qquad (21)$$

(9) Repeat the above steps in order until the outer edge of the lens is finally reached.

Repeat the process for negative increments in $r$ to calculate the lens configuration lying on the outer side of the tube axis.

By measuring the deviation distances $\epsilon$ which are observed in a color tube in which no corrective measures have been employed to compensate for the influence of the earth's magnetic field (vertical component) and utilizing these deviation measurements together with their associated deflection angles, the resultant calculations lead to a lens 70 having the general contour as shown in FIGURE 7.

The previous discussion covering the design criteria for producing the lenses of FIGURES 6 and 7 have assumed that all of the electron beams discussed moved in a horizontal plane which passes through the tube longitudinal axis and hence no account whatsoever has been taken of the fact that the electron beams also experience deflections in the vertical direction which is obviously the case in practical color tube operation. The vertical deflection angle ($\sigma$) has an effect upon the radius of curvature of the curved path which the moving electrons follow due to the earth's magnetic field, such that $$R\alpha\sqrt{_{\text{electron}}}\cdot\cos\sigma$$

This effect and others such as partial magnetic field shielding by tube components renders direct measurement of the magnetic shift most desirable.

As was previously mentioned, the lens system of the instant invention may be used simultaneously with the lens systems designed to correct for the effects of misconvergence and radial misregister. In the case where this is done, the "foreshortening" effect of adding lens systems to one another should be taken into account and appropriate adjustments must be made so as to avoid the creation of an additional error into the system.

It can be seen from the foregoing that the instant invention provides a novel apparatus and method for producing a phosphor dot pattern in tubes preferably of the shadow-mask variety which fully takes into account the effect of vertical component of the earth's magnetic field upon the electron beams of the color tube so as to maintain excellent color purity. The lens system of the instant invention is employed during the phosphor dot deposition process and hence requires no additional steps in the fabrication of color tubes.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. In an apparatus for producing the phosphor dot pattern of each primary color upon the face of color tubes of the shadow-mask type comprising:

a light source;

a lens system for forming phosphor dots at the proper locations being positioned between said light source and the color tube shadow-mask for deflecting the light rays passing through said lens system at a given angle to cause the light rays passing through the shadow-mask to strike the tube face at the same angle as the associated electron beam which experiences the effects of dynamic convergence and radial misregister, the improvement comprising a second lens system positioned between said mask and said light source to deflect said light rays so as to alter the phosphor dot pattern by an amount to compensate for the effect of the earth's magnetic field upon the associated electron beam.

2. The improvement of claim 1 wherein said second lens system is designed to deflect the light rays passing therethrough by an angle which is related to the angle of deflection of the electron beam.

3. The improvement of claim 1 wherein said second lens system is designed to deflect the light rays passing therethrough by an angle which is appropriate to correct for the additional deflection angle experienced by the electron beam due to the vertical component of the earth's magnetic field and where said angle is a function of the angle of primary deflection of the electron beam.

4. The improvement of claim 2 wherein said lens system is comprised of a substantially flat member of transparent material having an index of refraction N with said lens member being bent to form a slope M where $$M=M(N,\phi,T,\epsilon)$$

where T=thickness of said lens member; $\phi$=the deflection angle of the electron beam relative to the longitudinal axis of the color tube; and $\epsilon$=correction required to place the phosphor dots in the positions which take into account the effect of the earth's magnetic field upon the color tube electron beam.

5. The improvement of claim 1 wherein said lens system is comprised of a transparent member having an index of refraction N, said member being positioned substantially in alignment with the color tube longitudinal axis, said member having a slope M of one surface of said lens member where $$M=M(\phi,N,\epsilon)$$

where $\phi$=deflection angle of the electron beam, N=index of refraction of the transparent member, $\epsilon$=the correction required to place each phosphor dot in the position which takes into account the effect of the earth's magnetic field upon the color tube electron beam.

6. The improvement of claim 4 wherein the angle $m$ of the slope M is determined by solving the relationship $$H=\frac{T}{\cos\phi}\left[\sin(m+\phi)-\frac{\cos(m+\phi)\sin(m+\phi)}{[N^2-\sin^2(\phi+m)]^{1/2}}\right]$$

where the quantities H, $\phi$ are obtained through measurement of a color tube assembled without regard to providing any design compensation for the effect of the earth's magnetic field and where the values T and N are given.

7. The method for producing phosphor dot patterns of the three primary colors in tubes of the shadow-mask type comprising the steps of:

providing a shadow-mask tube assembled without utilizing a lens for compensatory deflection of the light beam to correspond to the effect of the earth's magnetic field upon the tube's electron beam;

measuring the deviation distances $\epsilon$ between the phosphor dots and the electron beam landings for each deflection angle $\phi$ of each electron beam;

providing a flat sheet lens having index of refraction N and thickness T to compensate for the effect of the earth's magnetic field upon the tube's electron beam;

bending the sheet so that its slope angle $m$ is determined by solving the equation $$H=\frac{T}{\cos\phi}\left[\sin(m+\phi)-\frac{\cos(m+\phi)\sin(m+\phi)}{[N^2-\sin^2(m+\phi)]^{1/2}}\right]$$

where H is the deviation distance between the electron beam and a light ray at each point along the lens;

$m$ is the slope of the lens; and $\phi$ is the electron beam deflection angle.

8. The method for producing phosphor dot patterns of the three primary colors in tubes of the shadow-mask type comprising the steps of:

providing a shadow-mask tube assembled without utilizing a lens for compensatory deflection of the light beam to correspond to the effect of the earth's magnetic field upon the tube's electron beam;

measuring the deviation distances $\epsilon$ between the phosphor dots and the electron beam landings for each deflection angle $\phi$ of each electron beam;

providing a transparent lens member having an index of refraction N to compensate for the effect of the earth's magnetic field upon the tube's electron beam;

providing at least one surface of said member with a slope M where M is determined by solving the equations $$M=\frac{\sin\theta_3-\sin\theta_1}{N\cos\theta_2-\cos\theta_3} \quad (1)$$

$$N\sin\theta_2=\sin\theta_1 \quad (2)$$

$$\tan\theta_3=\frac{r+P\frac{\epsilon}{Q}}{D+T} \quad (3)$$

$\theta_1$=angle between light ray and the tube longitudinal axis;

$\theta_2$=angle between light ray within the lens member and the longitudinal axis;

$\theta_3$=angle between light ray leaving the lens member and the tube longitudinal axis;

Q=axial separation of the mask and screen;

D=axial separation of a light source and the first surface of said lens;

T=the thickness of said lens at lens coordinate $r$;

$r$=the length of a perpendicular from the longitudinal tube axis to any point on the lens surface, said perpendicular lying in a horizontal plane passing through said longitudinal tube axis.

References Cited

UNITED STATES PATENTS

| | | | |
|---|---|---|---|
| 2,936,683 | 5/1960 | Burdick et al. | 95—1 |
| 3,008,390 | 11/1961 | Heil | 95—1 |
| 3,187,650 | 6/1965 | Hudson | 95—1 |

NORTON ANSHER, *Primary Examiner.*

JOHN M. HORAN, *Examiner.*

RICHARD M. SHEER, *Assistant Examiner.*